No. 618,550. Patented Jan. 31, 1899.
P. A. N. WINAND.
RAISING AND SUPPLYING LIQUIDS FOR COMBUSTION, &c.
(Application filed Jan. 31, 1896.)
(No Model.) 2 Sheets—Sheet 1.
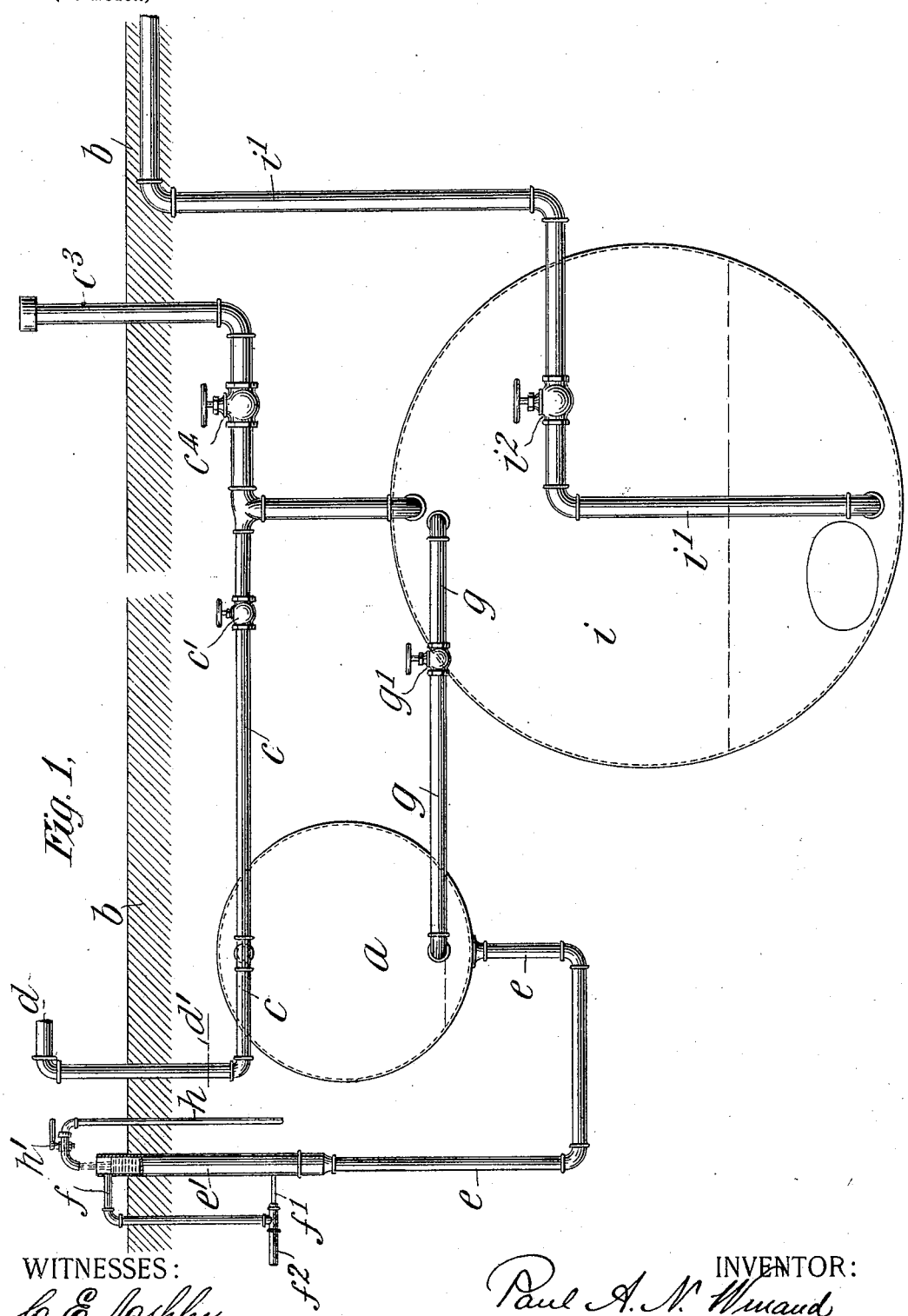

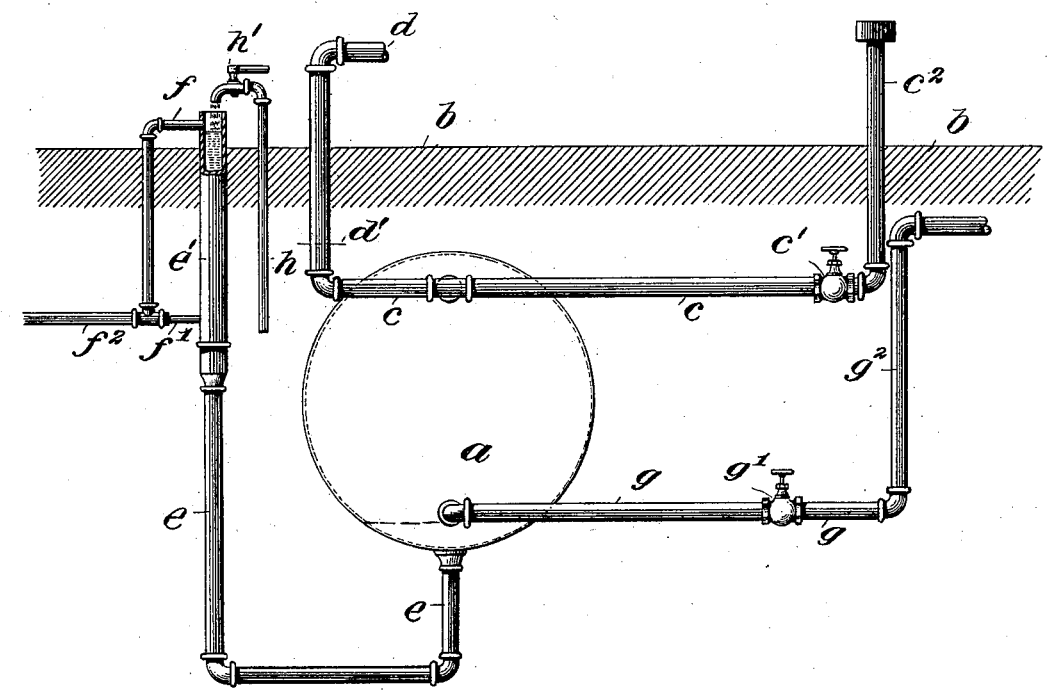

UNITED STATES PATENT OFFICE.

PAUL A. N. WINAND, OF PHILADELPHIA, PENNSYLVANIA, ASSIGNOR TO THE OTTO GAS ENGINE WORKS, OF SAME PLACE.

RAISING AND SUPPLYING LIQUIDS FOR COMBUSTION, &c.

SPECIFICATION forming part of Letters Patent No. 618,550, dated January 31, 1899.

Application filed January 31, 1896. Serial No. 577,541. (No model.)

*To all whom it may concern:*

Be it known that I, PAUL A. N. WINAND, a subject of the King of Belgium, and a resident of the city of Philadelphia, county of Philadelphia, State of Pennsylvania, have invented certain new and useful Improvements in Raising and Supplying Liquids for Combustion, &c., of which the following is a specification.

The invention is designed more especially for handling liquid fuels, as hydrocarbon oils. Its object is to discharge the liquid from a tank at a desired pressure, and it may therefore be delivered for consumption at a point above the level of the tank, and then, when desired, to relieve the liquid from such pressure, thus arresting its delivery for consumption or permitting it to fall in the delivery-pipe. To this end the desired pressure is imparted to the liquid in the tank by the pressure of a column of fluid of a greater density—for instance, water—and the organization is such that during the discharge of the liquid under pressure from the tank the column of water is maintained by a constant supply of water, and when the pressure upon the liquid in the tank is to be removed the flow of water to the column is cut off and the water forming the pressure-column runs to waste through a suitable outlet located at its base. With such an organization the liquid-fuel tank may be located underground, oil raised to the level above the ground for consumption, and then when not needed the level of the oil in the delivery-pipe may fall to a level beneath the surface of the ground, if desired.

The invention also includes an organization in which a storage-tank is associated with the supply or delivery tank, as hereinafter set forth.

In the accompanying drawings, Figure 1 shows an arrangement of supply and storage tanks and system of pipes connected therewith. Fig. 2 shows an arrangement of the supply or delivery tank and its pipe system when the storage-tank is omitted.

$a$ represents the supply-tank, shown as located underground. $b$ represents the ground-level. A pipe $c$ is connected to the upper part of the tank $a$ and is shown as extending upwardly to a supply-main or delivery-pipe $d$ and provided in its other part beyond its connection with tank $a$ with a valve or cock $c'$, to which is attached a vertical filling-pipe $c^2$. (Shown in Fig. 2.)

From the lower part of the tank $a$ extends the pipe $e$, which, with the enlarged portion $e'$ at the upper end of its vertical limb, contains the water column, and in the side of this part $e'$ are two discharge-openings $f$ and $f'$, forming overflows into the pipe $f^2$. The lower one, $f'$, of these openings is made of comparatively small capacity to reduce the amount of water used, and in the arrangement shown the openings are so located relatively to the main level $d$ and a level, as at $d'$, below the ground-surface that the hydrostatic pressure of the column of water at $f$ and $f'$ will balance or about balance the fluid at the levels $d$ and $d'$, respectively. A pipe $g$, provided with a valve $g'$, passes from the tank $a$ a short distance from its lower side and is continued into the portion $g^2$, Fig. 2, for the purpose of setting forth the functions of the apparatus so far as described.

Water is supplied to the top of the column $e\ e'$ from any available source by means of the pipe $h$ and stop-cock $h'$.

Referring particularly to Fig. 2, the operation of this part of the apparatus is as follows: The valves $c'$ and $g'$ being closed and the tank $a$ filled with a hydrocarbon oil or other fluid of less density than water, when it is required to use the fluid from the main level $d$ water is allowed to flow from $h'$ into the open end of the part $e'$ of the column-pipe in quantity somewhat in excess of what will flow out of the discharge-opening or overflow $f'$, and when the water-level has reached the overflow $f$ the pressure of the column of water will have raised the fluid from the tank $a$ to the level $d$ and cause a continual discharge of the fluid for any practical use as long as the water-supply is sufficient to maintain the level at $f$ and replace the fluid forced out from the tank $a$. Now when the flow from level $d$ is stopped or the appliance supplied with the fluid shut down the water-supply at $h'$ is discontinued, and the water-level of the column will gradually fall to the discharge-opening $f'$, and with it will fall the oil-level to a point as at $d'$, thus causing the mains aboveground to be emptied at such times as the appliances are inoperative.

The quantity of water supplied at $h'$ should be equal to or in excess of the quantity required to displace the liquid in the tank and that which overflows at $f'$. When the quantity is in excess, as it always would be in practice, the surplus runs to waste through $f$. Of course the smaller the outlet $f'$ the less water is wasted, the supply at $h'$ being of course closely regulated to what is required.

The tank $a$ may be replenished with fluid through the filling-pipe $c^2$, the valve $c'$ being then opened and the valve $g'$ being also opened to allow of the discharge through the pipe $g$ $g^2$ of the water that has accumulated in the tank, and this refilling of the tank may be done while the appliances are in operation.

Referring to the storage part of the apparatus, as shown in Fig. 1, the storage-tank $i$ is located at a lower level than the tank $a$, and the pipe $c$ beyond the valve $c'$ extends into the upper part of the tank $i$. The pipe $g$ beyond the valve $g'$ also extends into the upper part of the tank $i$. The pipe $c$ is now also connected to a filling-pipe $c^3$, and this pipe is provided with a stop-cock $c^4$. From the bottom of the tank $i$ extends a water-discharge pipe $i'$, provided with a valve $i^2$. With the apparatus so organized, the valves $c'$ and $g'$ being open and the valves $c^4$ and $i^2$ closed and with the fluid being forced from the tank $a$, as before described, it will be seen that the tank $a$ will be kept filled with fluid, for the reason that the water entering it through the pipe $e$, passing immediately from this tank through the pipe $g$ into the tank $i$, forces the fluid from tank $i$ through the pipe $c$ into tank $a$, or some of the fluid from $i$ may pass directly to the main or delivery-pipe $d$.

To refill the storage-tank $i$, the valves $c'$ and $g'$ are closed, the valves $c^4$ and $i^2$ opened, and the fluid supplied through the filling-pipe $c^3$, the water in the tank $i$ being forced out through the discharge-pipe $i'$. This may be done without interrupting the delivery of fluid from the tank $a$.

I claim as my invention—

1. The combination of the supply-tank, a delivery-pipe connected to the upper part thereof, a stand-pipe for a liquid pressure-column connected to the lower part of the tank and having two discharge-openings, the lower one of which is located below the level of discharge of the delivery-pipe, the upper discharge determining the maximum pressure of the pressure-column and the lower discharge its minimum pressure, substantially as set forth.

2. The combination of the supply-tank, a delivery-pipe connected to the upper part thereof, a stand-pipe for a liquid pressure-column connected to the lower part of the supply-tank, a filling-pipe connected with the upper part of the supply-tank, and a water-discharge pipe connected to the lower part of the tank and extending upwardly so that its outlet is a suitable distance above the lower part of the tank, the arrangement being such that the pressure of the liquid entering the tank by the filling-pipe is sufficient to displace the water in the tank and outlet-pipe, substantially as set forth.

3. The combination of a supply-tank, a delivery-pipe connected to the upper part thereof, a stand-pipe for a liquid pressure-column connected to the lower part of the tank, a storage-tank located below the supply-tank, a pipe connection from the lower part of the supply-tank to the storage-tank and a pipe connection from the upper part of the supply-tank to the upper part of the storage-tank, substantially as set forth.

4. The combination of a supply-tank, a delivery-pipe connected to the upper part thereof, a stand-pipe for a liquid pressure-column connected to the lower part of the tank, a storage-tank located below the supply-tank, a pipe connection from the lower part of the supply-tank to the upper part of the storage-tank, a pipe connection from the upper part of the supply-tank to the upper part of the storage-tank, a filling-pipe connected to the upper part of the storage-tank, and a discharge-pipe connected with the lower part of the storage-tank, the arrangement being such that the pressure of the liquid entering the storage-tank through the filling-pipe shall be sufficient to force the water out of said tank, substantially as set forth.

In testimony whereof I have hereunto subscribed my name.

PAUL A. N. WINAND.

Witnesses:
R. S. REED,
ISAIAH MATTOCK.